(12) United States Patent
Bogu et al.

(10) Patent No.: US 12,244,667 B1
(45) Date of Patent: Mar. 4, 2025

(54) SYSTEMS AND METHODS FOR TOKENIZED DATA TRANSFERS BETWEEN ELECTRONIC DEVICES IN A DISTRIBUTED NETWORK

(71) Applicant: BANK OF AMERICA CORPORATION, Charlotte, NC (US)

(72) Inventors: Sivakumar Bogu, Telengana (IN); Chinmay S. Barhale, Telengana (IN); Deepak Gujaba Gaikwad, Singapore (SG); Debraj Goswami, Telangana (IN); Satyasai Veera Venkata Gudimetla, Telangana (IN); Kiran Pulla, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 62 days.

(21) Appl. No.: 18/242,063

(22) Filed: Sep. 5, 2023

(51) Int. Cl.
*H04L 67/1095* (2022.01)
(52) U.S. Cl.
CPC .............................. *H04L 67/1095* (2013.01)
(58) Field of Classification Search
None
See application file for complete search history.

(56) References Cited

U.S. PATENT DOCUMENTS

| | | | |
|---|---|---|---|
| 2019/0156326 A1* | 5/2019 | Todasco | H04W 4/80 |
| 2020/0351657 A1* | 11/2020 | Wentz | H04L 9/3231 |
| 2023/0019180 A1* | 1/2023 | de Nijs | G06F 21/577 |

OTHER PUBLICATIONS

Das et al., "Security Mechanism for Packaged Web Applications", Jun. 1, 2017, IEEE, 2017 IEEE International Conference on Web Services (ICWS) (2017, pp. 612-619) (Year: 2017).*

* cited by examiner

*Primary Examiner* — Davoud A Zand
(74) *Attorney, Agent, or Firm* — Moore & Van Allen PLLC; Michael M. McCraw

(57) ABSTRACT

Systems, methods, and computer program products are provided herein for tokenized data transfers between electronic devices in a distributed network. An example method includes receiving a request for a tokenized data transfer associated with at least a first user and determining one or more data transfer parameters defining the tokenized data transfer request. The example method further includes generating a data transfer token for the first user based on the data transfer parameters where the data transfer token includes at least a first resource associated with the first user. The example method also includes providing the data transfer token within a mobile resource application of the first user. A second user associated with the request for the tokenized data transfer based may be determined based on the one or more data transfer parameters, and the method may include effectuating the tokenized data transfer between the users.

20 Claims, 10 Drawing Sheets

SYSTEMS AND METHODS FOR TOKENIZED DATA TRANSFERS BETWEEN ELECTRONIC DEVICES IN A DISTRIBUTED NETWORK

TECHNOLOGICAL FIELD

Example embodiments of the present disclosure relate generally to data transfers and, more particularly, to systems and methods for generating data transfer tokens for tokenized data transfers.

BACKGROUND

Electronic networks, communication systems, computing devices, and other systems may facilitate data transfers between users and associated user devices. Applicant has identified a number of deficiencies and problems associated with conventional data transfer systems and associated methods. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided herein for tokenized data transfers between electronic devices in a distributed network. In one aspect, a system for tokenized data transfers may include at least one non-transitory storage device and at least one processor coupled to the at least one non-transitory storage device. The at least one processor may receive a request for a tokenized data transfer associated with at least a first user and determine one or more data transfer parameters defining the tokenized data transfer request. The processor may further generate a data transfer token for the first user based on the data transfer parameters where the data transfer token includes at least a first resource associated with the first user and provide the data transfer token within a mobile resource application of the first user.

In some embodiments, in providing the data transfer token within the mobile resource application of the first user, the processor may further be configured to generate a hybrid user interface displaying a first portion of resources of the first user that includes the data transfer token including the first resource and a second portion of resources including untokenized resources of the first user.

In some embodiments, the processor may be further configured to access a plurality of resources associated with the first user and determine the first resource defining a portion of the plurality of resources associated with the first user based at least in part on the one or more data transfer parameters. In such an embodiment, the processor may further generate the data transfer token for the first resource and modify the plurality of resources associated with the first user to account for the data transfer token.

In some embodiments, the processor may be further configured to determine a second user associated with the request for the tokenized data transfer based at least in part on the one or more data transfer parameters and effectuate the tokenized data transfer between the mobile resource application of the first user and the second user.

In some further embodiments, the processor may be further configured to generate a user notification to the first user and effectuate the tokenized data transfer in response to an authorization action by the first user responsive to the user notification.

Additionally or alternatively, in some further embodiments, the processor may be further configured to effectuate the tokenized data transfer from the mobile resource application of the first user to a mobile resource application of the second user.

In some embodiments, the processor may be configured to encrypt one or more data entries associated with the data transfer token.

In some embodiments, the first data transfer token may be associated with one or more data records stored via a distributed ledger.

In some embodiments, the processor may be further configured to receive a request for detokenization associated with the data transfer token that includes at the least the first resource and liquidate the first data transfer token. In such an embodiment the processor may be configured to return the first resource to the mobile resource application of the first user in a untokenized form.

In another aspect, a computer program product for tokenized data transfers between electronic devices in a distributed network is provided. The computer program product may include a non-transitory computer-readable medium comprising code. The code, when executed, may cause an apparatus to receive a request for a tokenized data transfer associated with at least a first user, determine one or more data transfer parameters defining the tokenized data transfer request, generate a data transfer token for the first user based on the data transfer parameters, wherein the data transfer token includes at least a first resource associated with the first user, and provide the data transfer token within a mobile resource application of the first user.

In another aspect, a method for tokenized data transfers between electronic devices in a distributed network is provided. The method may include receiving a request for a tokenized data transfer associated with at least a first user, determining one or more data transfer parameters defining the tokenized data transfer request, generating a data transfer token for the first user based on the data transfer parameters, wherein the data transfer token includes at least a first resource associated with the first user, and providing the data transfer token within a mobile resource application of the first user.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
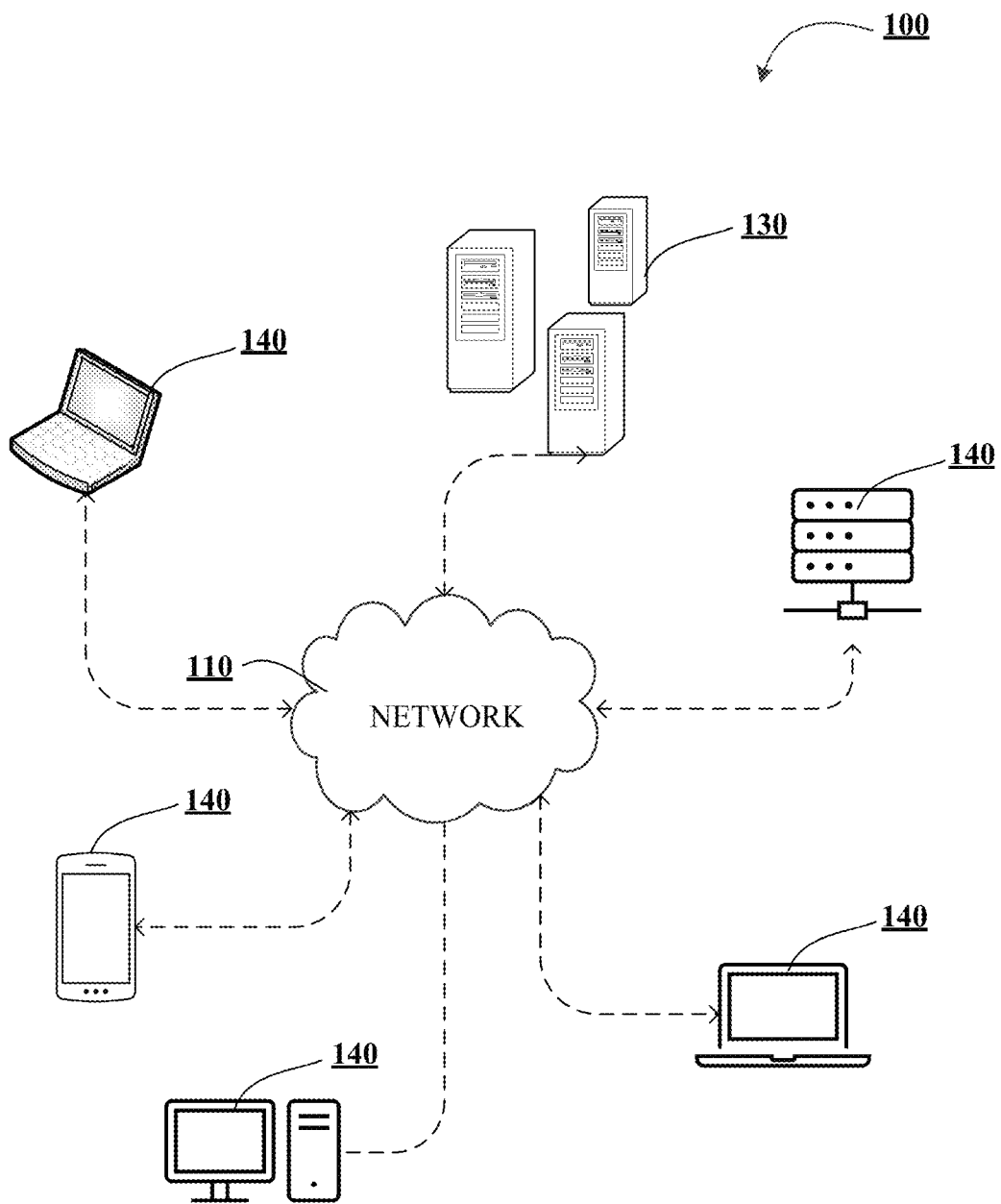
FIGS. 1A-1C illustrate technical components of an exemplary distributed computing environment for tokenized data transfers in accordance with one or more embodiments of the present disclosure.

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that may be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, investment vehicles, cryptographic and/or digital currencies, and/or the like. In yet other embodiments, the resources may include real-world goods or commodities that may be acquired and/or exchanged by a user.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

As described above, electronic networks, communication systems, computing devices, and other systems may effectuate data transfers between devices. For example, a first user may intend to initiate a data transfer to second user to provide one or more resources of the first user to the second user. In some instances, however, this data transfer may be vulnerable to interference by a third party or other unauthorized actor, particularly in instances in which mobile resource applications of the users are involved. For example, an unauthorized actor may attempt to monitor resource data of a user's mobile wallet (e.g., a mobile resource application) and attempt to extract user account data, resource information, and/or the like. As such, traditional systems often fail to effectively secure data transfers between electronic devices in distributed network environments.

In order to solve these issues and others, embodiments of the present disclosure provide systems and methods for tokenized data transfers between electronic devices that secure these data transfers from unauthorized interference. An example system may receive a request for a tokenized data transfer, with a mobile resource application or otherwise, and determine data transfer parameters (e.g., implicated resource, intended recipient, etc.) that define the transfer. As opposed to traditional data transfer systems in which data resources are maintained in unsecured formats, the implementations described herein generate a data transfer token (e.g., non-fungible token (NFT)) that is secured via one or more distributed ledgers, blockchain systems, or the like for effectuating a secure data transfer between user devices. This data transfer token may be provided to a mobile resource application of the first user for further transferring to intended recipient users. By securing data resources via data transfer tokens within the mobile resource application of the user, these resources are further secured prior to transfer to another user. Furthermore, the use of data transfer tokens with data records secured via distributed ledgers or the like provide immutable and durable mechanisms for tracking data transfers, such as by tracking an ownership chain of a particular data transfer token.

Example System and Circuitry Components

Figure 1B:
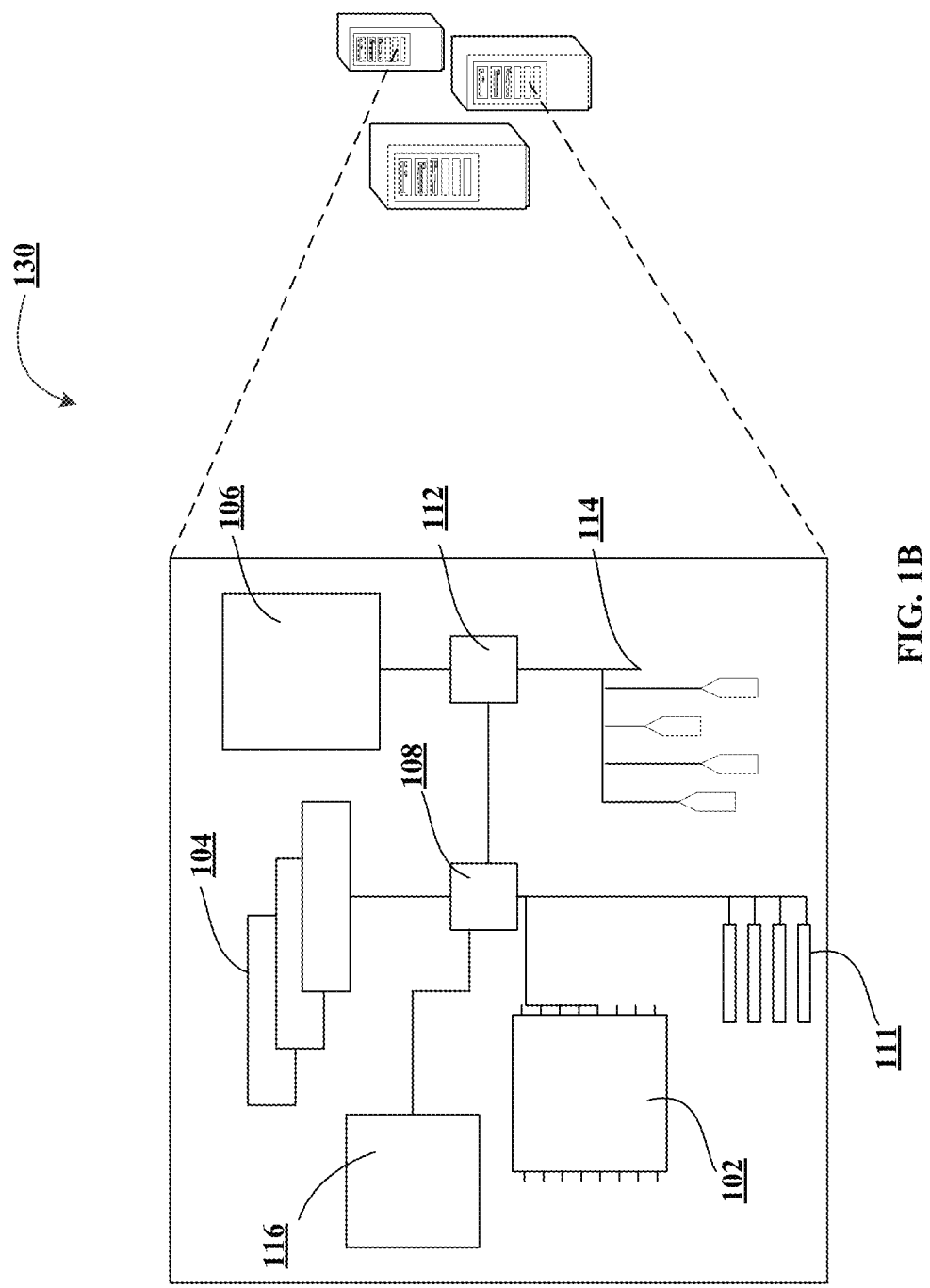
Figure 1C:
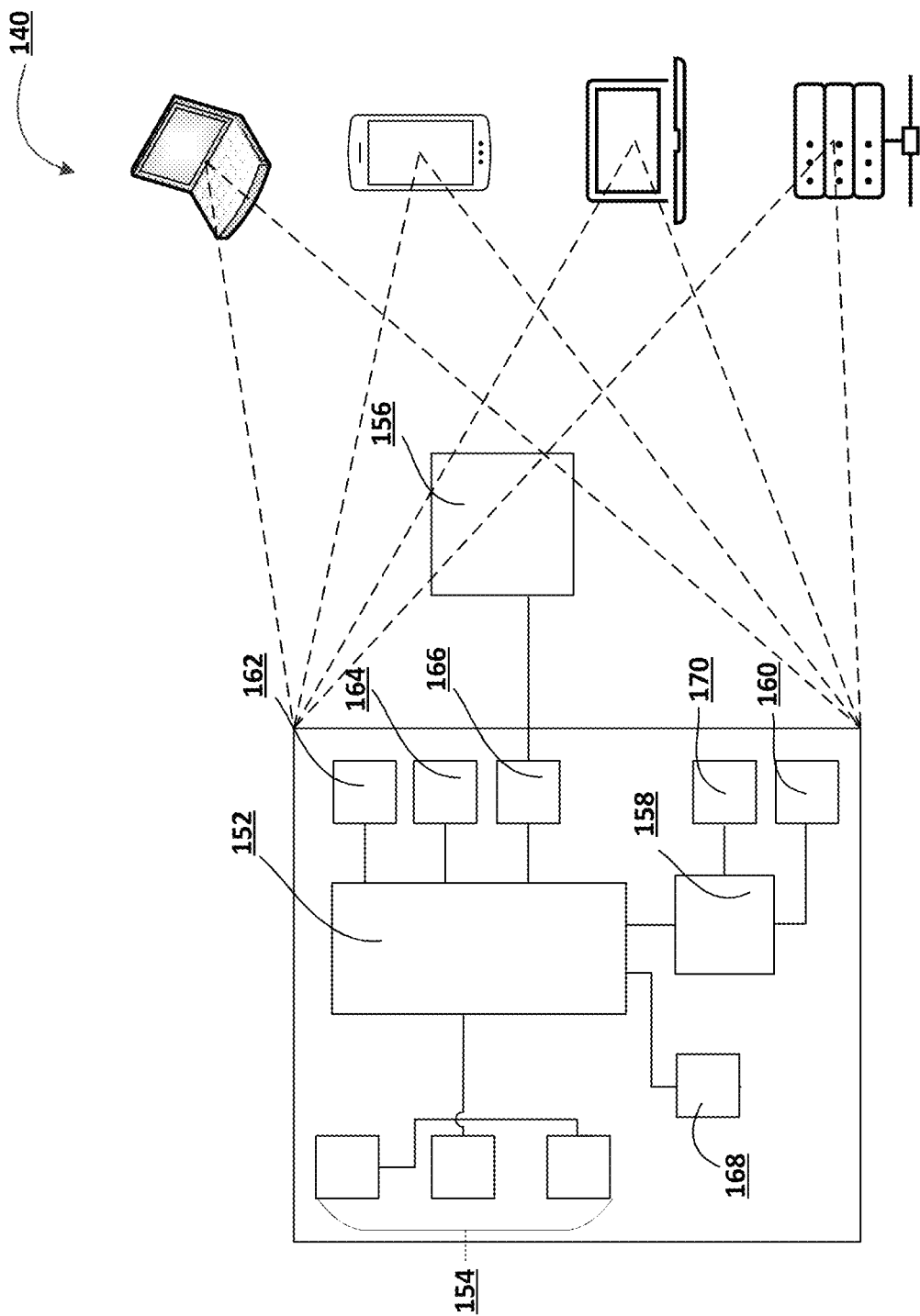

FIGS. 1A-1C illustrate technical components of an exemplary distributed computing environment for tokenized data transfers 100, in accordance with one embodiment of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which may be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments described herein. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2A:
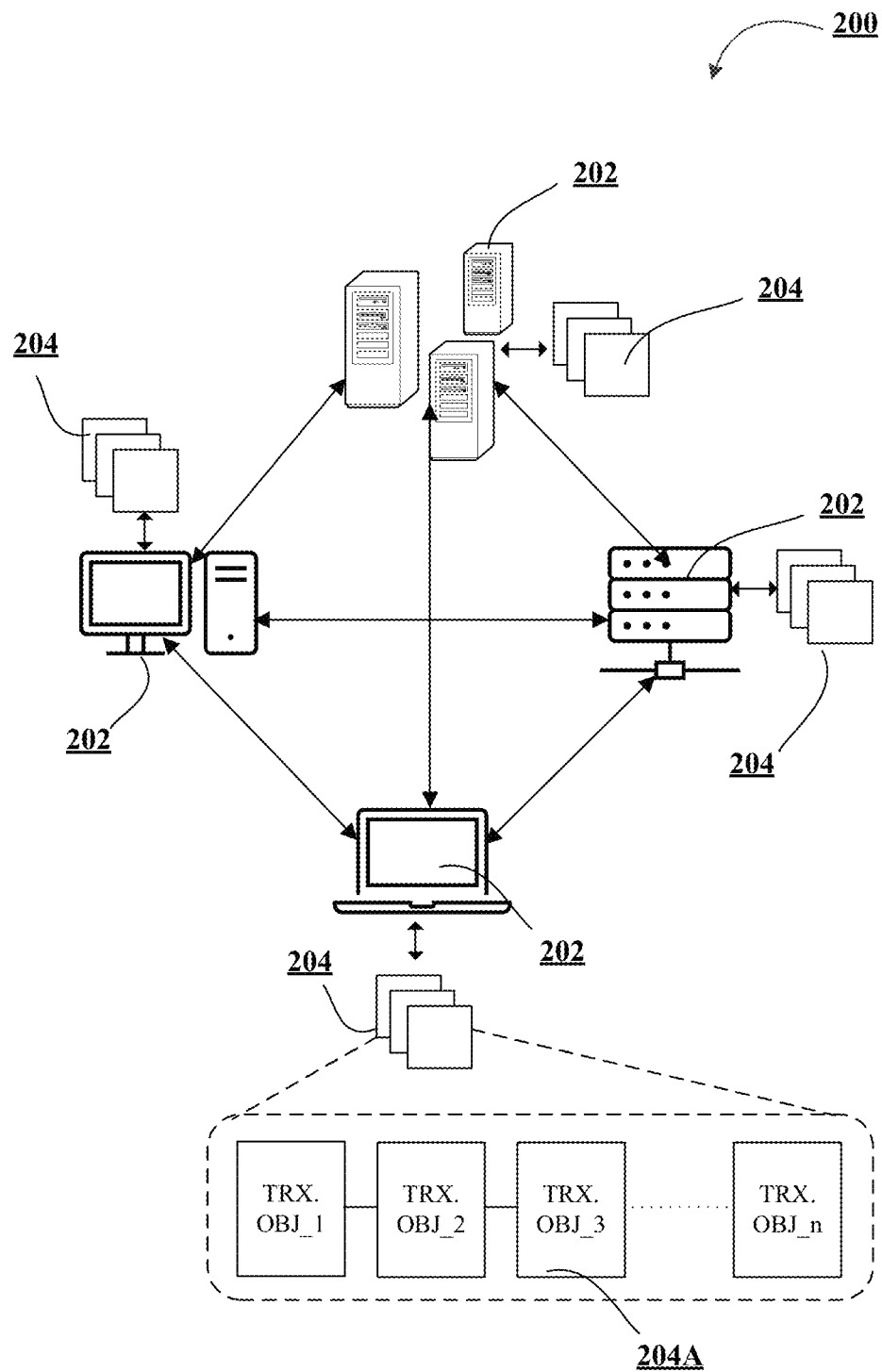
FIG. 2A illustrates an exemplary DLT architecture, in accordance with an embodiment of the disclosure.
Figure 2B:
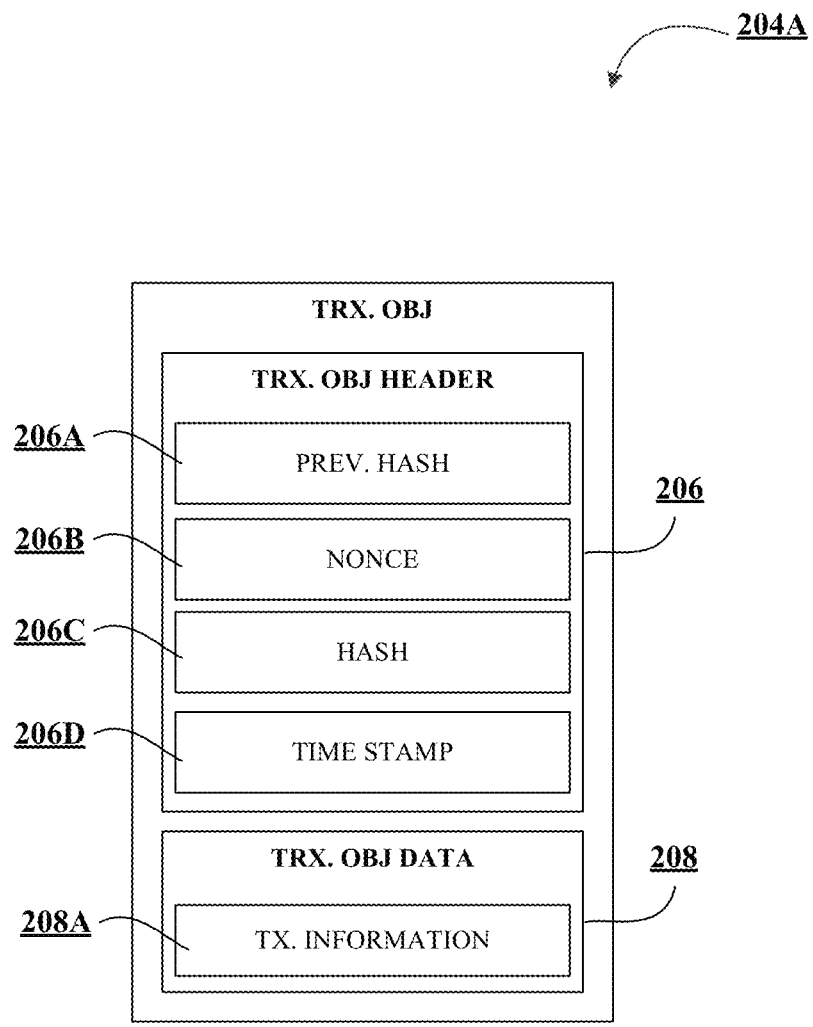
FIG. 2B illustrates an exemplary transaction object within the DLT architecture, in accordance with an embodiment of the disclosure.

FIGS. 2A-2B illustrate an exemplary distributed ledger technology (DLT) architecture, in accordance with an embodiment of the invention. DLT may refer to the protocols and supporting infrastructure that allow computing devices (e.g., peers) in different locations to propose and validate transactions and update records in a synchronized way across a network. Accordingly, DLT is based on a decentralized model, in which these peers collaborate and build trust over the network. To this end, DLT may use a peer-to-peer protocol for a cryptographically secured distributed ledger of transactions represented as transaction objects (which may also be referred to herein as "data records") that are linked. In some embodiments, the transaction objects or data records may contain state information about a resource that is tracked by the system. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT may use smart contracts. "Smart contracts" as used herein may refer to computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A "public distributed ledger" as referred to herein may refer to a distributed ledger that anyone in the world may read, by which anyone in the world may send transactions to and expect to see them included if they are valid, and anyone in the world may participate in the consensus process for determining which transaction objects get added to the distributed ledger and what the current state each transaction object is. A public distributed ledger is generally considered to be fully decentralized. Alternatively, a fully private distributed ledger may be a distributed ledger whereby permissions are kept centralized with one entity. The permissions may be public or restricted to an arbitrary extent. And lastly, a consortium distributed ledger may be a distributed ledger where the consensus process is controlled by a pre-selected set of nodes; for example, a distributed ledger may be associated with a number of member institutions (e.g., fifteen (15)), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes. The transaction objects 204A may comprise an origin transaction object that may serve as the beginning of a chain of transaction objects, such that transaction objects 204A are added to the end of the chain beginning from the origin transaction object. In some embodiments, a subchain may be formed from any of the transaction objects 204A within the distributed ledger 204, where the subchain may comprise information relating to a specific resource tracked by the system.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

An NFT is a cryptographic record (referred to herein as "tokens" and/or "data transfer tokens") comprising or otherwise linked to a resource. An NFT is typically stored on a distributed ledger that certifies ownership and authenticity of the resource and is exchangeable in a peer-to-peer network.

Figure 3A:
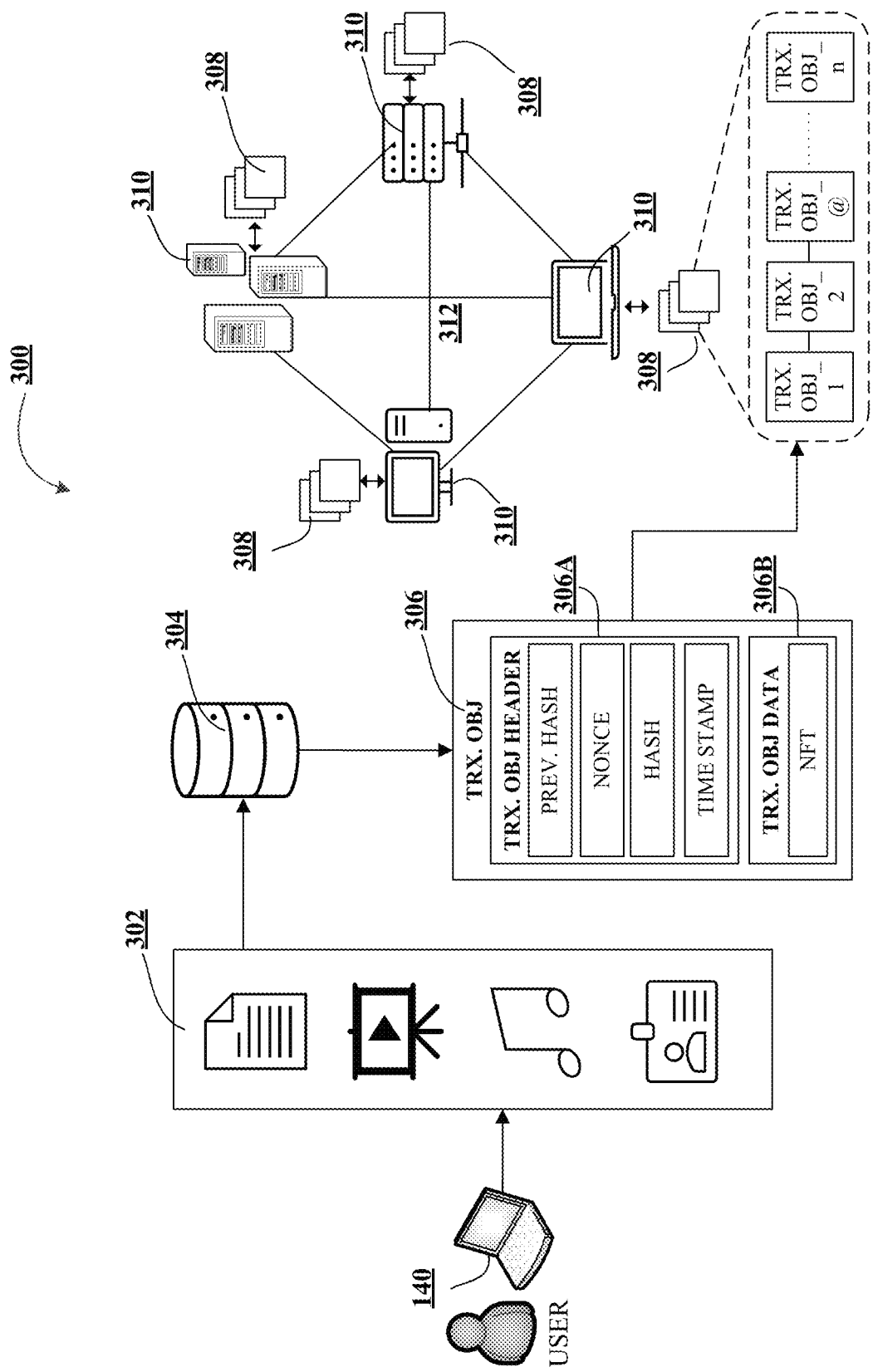
FIG. 3A illustrates an exemplary process of creating an NFT 300, in accordance with an embodiment of the disclosure.

FIG. 3A illustrates an exemplary process of creating an NFT 300, in accordance with an embodiment of the present disclosure. As shown in FIG. 3A, to generate or "mint" an NFT, a user (e.g., NFT owner) may identify, using a user input device 140, resources 302 that the user wishes to mint as an NFT. Typically, NFTs are minted from digital objects that represent both tangible and intangible objects. These resources 302 may include a piece of art, music, collectible, virtual world items, videos, real-world items such as artwork and real estate, or any other presumed valuable object. By way of a non-limiting example described herein, an example data transfer token (e.g., an NFT) may comprise a first resource (e.g., funds or other financial instruments associated with monetary value). These resources 302 are then digitized into a proper format to produce an NFT 304. The NFT 304 may be a multi-layered documentation that identifies the resources 302 but also evidences various transaction conditions associated therewith, as described in more detail with respect to FIG. 3A.

To record the NFT in a distributed ledger, a transaction object 306 for the NFT 304 is created. The transaction object 306 may include a transaction header 306A and a transaction object data 306B. The transaction header 306A may include a cryptographic hash of the previous transaction object, a nonce—a randomly generated 32-bit whole number when the transaction object is created, cryptographic hash of the current transaction object wedded to the nonce, and a time stamp. The transaction object data 306B may include the NFT 304 being recorded. Once the transaction object 306 is generated, the NFT 204 is considered signed and forever tied to its nonce and hash. The transaction object 306 is then deployed in the distributed ledger 308. At this time, a distributed ledger address is generated for the transaction object 306, i.e., an indication of where it is located on the distributed ledger 308 and captured for recording purposes. Once deployed, the NFT 304 is linked permanently to its hash and the distributed ledger 308, and is considered recorded in the distributed ledger 308, thus concluding the minting process As shown in FIG. 3A, the distributed ledger 308 may be maintained on multiple devices (nodes) 310 that are authorized to keep track of the distributed ledger 308. For example, these nodes 310 may be computing devices such as system 130 and end-point device(s) 140. One node 310 may have a complete or partial copy of the entire distributed ledger 308 or set of transactions and/or transaction objects on the distributed ledger 308. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

Figure 3B:
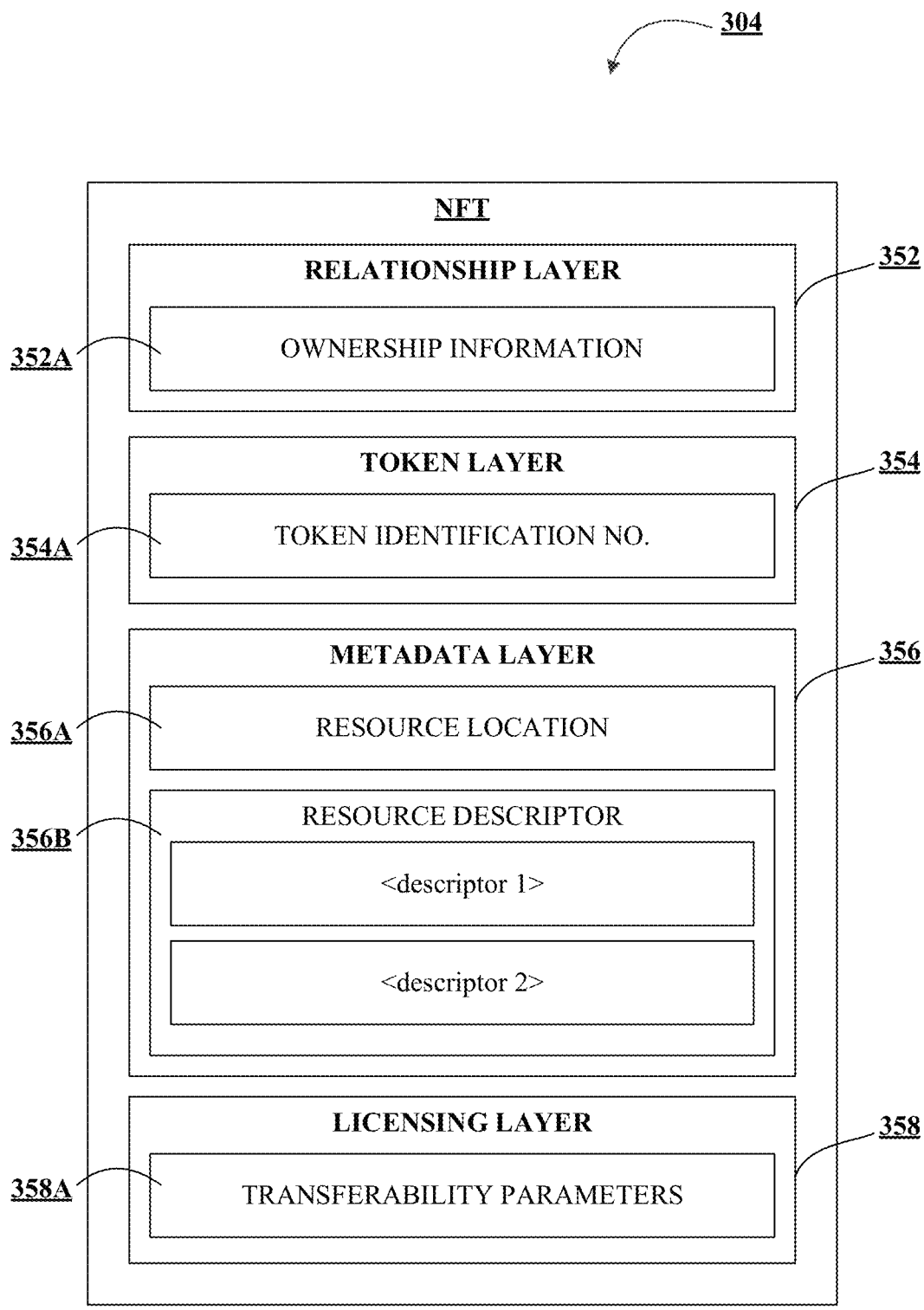
FIG. 3B illustrates an exemplary NFT as a multi-layered documentation of a resource, in accordance with an embodiment of the disclosure.

FIG. 3B illustrates an exemplary NFT 304 as a multi-layered documentation of a resource, in accordance with an embodiment of an invention. As shown in FIG. 3B, the NFT may include at least relationship layer 352, a token layer 354, a metadata layer 356, and a licensing layer 358. The relationship layer 352 may include ownership information 352A, including a map of various users that are associated with the resource and/or the NFT 304, and their relationship to one another. For example, if the NFT 304 is purchased by buyer BI from a seller Si, the relationship between BI and Si as a buyer-seller is recorded in the relationship layer 352. In another example, if the NFT 304 is owned by O1 and the resource itself is stored in a storage facility by storage provider SP1, then the relationship between O1 and SP1 as owner-file storage provider is recorded in the relationship layer 352. The token layer 354 may include a token identification number 354A that is used to identify the NFT 304. The metadata layer 356 may include at least a file location 356A and a file descriptor 356B. The file location 356A may provide information associated with the specific location of the resource 302. Depending on the conditions listed in the smart contract underlying the distributed ledger 308, the resource 302 may be stored on-chain (i.e., directly on the distributed ledger 308 along with the NFT 304) or off-chain (i.e., in an external storage location). The file location 356A identifies where the resource 302 is stored. The file descriptor 356B may include specific information associated with the source itself 302. For example, the file descriptor 356B may include information about the supply, authenticity, lineage, provenance of the resource 302. The licensing layer 358 may include any transferability parameters 358B associated with the NFT 304, such as restrictions and licensing rules associated with purchase, sale, and any other types of transfer of the resource 302 and/or the NFT 304 from one person to another. Those skilled in the art will appreciate that various additional layers and combinations of layers can be configured as needed without departing from the scope and spirit of the invention.

Example Methods for Tokenized Data Transfers

Figure 4:
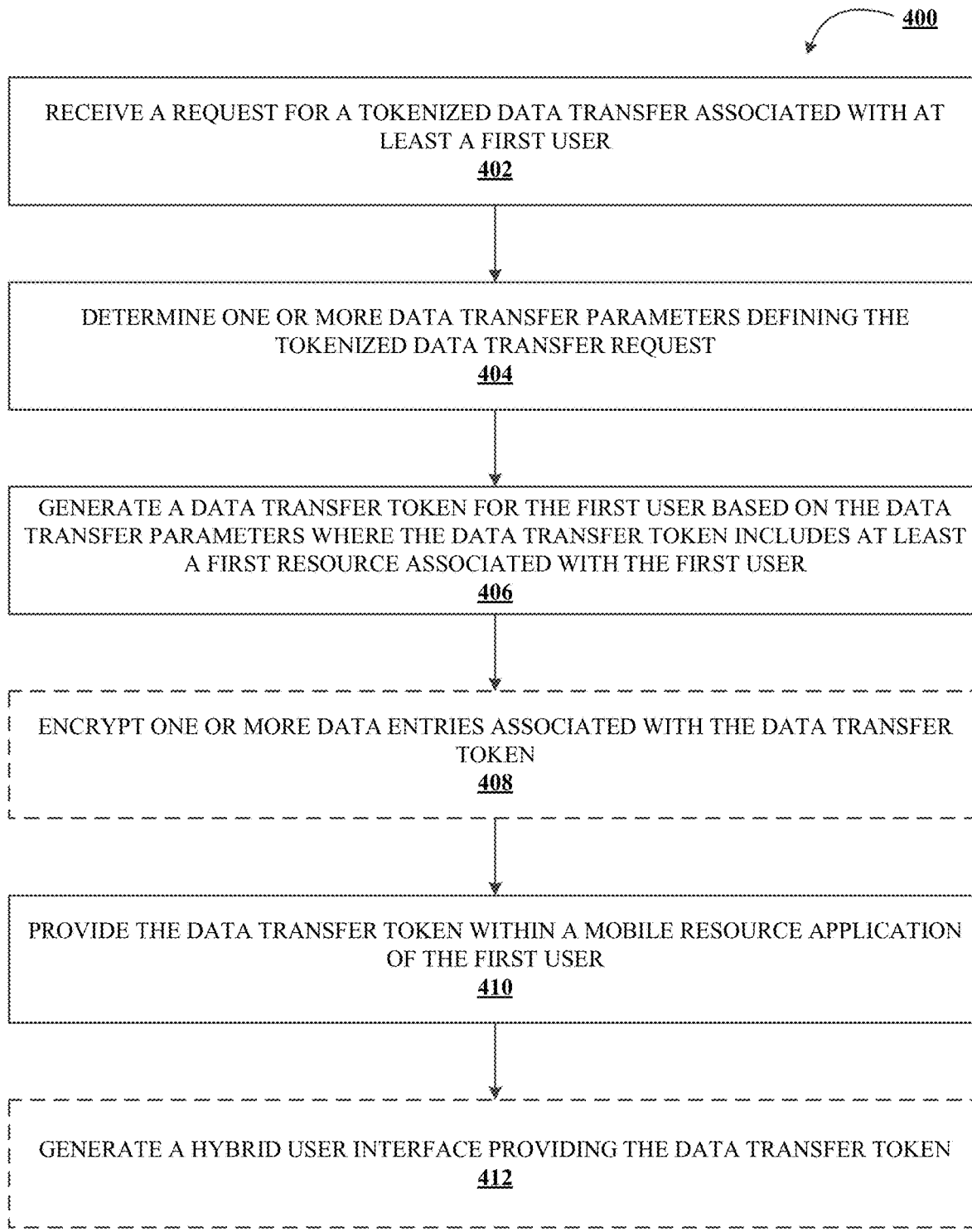
FIG. 4 illustrates a method for tokenized data transfers in accordance with one or more embodiments of the present disclosure.

FIG. 4 illustrates a flowchart containing a series of operations for tokenized data transfers (e.g., method 400). The operations illustrated in FIG. 4 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-3B (e.g., processor 102, processor 152, etc.).

As shown in operation 402, the system 130 may be configured to receive a request for a tokenized data transfer associated with at least a first user. As described above, the system 130 of the present application may be configured to facilitate data transfers between users that interact with the system 130 and/or manage resources associated with these respective users. In some embodiments, the request received at operation 402 may be received from a first user device associated with the first user. By way of example, the first user may interact with an application of the system 130 by which the first user may access, manage, interact with, etc. one or more resources associated with the first user. Such an application, for example, may refer to a mobile resource application (e.g., a mobile wallet or the like) provided by the system 130 by which a first user may interact with a first resource (e.g., funds or other financial instruments associated with underlying monetary value). In such an example implementation, the request at operation 402 may be received in response to one or more user inputs provided to the system 130 within the mobile resource application.

In some embodiments, the request received at operation 402 may be received in response to a user input associated with a presently occurring request for data transfer. By way of continued example, the first user may interact with the system 130 via a mobile resource application of the system 130 as part of initiating a data transfer between the requesting first user and an intended recipient of the data transfer (e.g., an example second user). As such, the request received at operation 402 may occur responsive to an intended data transfer associated with the first user in which the intended recipient is known or otherwise determinable. In some embodiments, the request received at operation 402 may be associated with a data transfer that will occur at a future time (e.g., a time that is later-in-time than generation of the data transfer token described hereinafter). By way of example, the first user may intend to effectuate a data transfer with a second user at a later time and use the operations of FIG. 4 to secure a resource associated with the first user within the mobile resource application of the first user (e.g. a token store in the mobile wallet of the first user).

In some embodiments, the request received at operation 402 may occur without explicit action by the first user. By way of example, the system 130 may operate to effectuate tokenized data transfers by generating data transfers associated with common or frequent data transfer interactions. The system 130 may, for example, access a plurality of data transfers associated with the first user and associated resources of the first user that may be used in these data transfers. In some instances, for example, the system 130 may access a plurality of data transfers between the first user and the second user that are associated with particular portions of resources (e.g., funds or other financial instruments associated with monetary value). In such an embodiment, the system may receive the request at operation 402 as part of an internal transmission (e.g., an instruction generated by the system 130) to generate a data transfer token for subsequent data transfers for the first user.

Thereafter, as shown in operation 404, the system 130 may be configured to determine one or more data transfer parameters defining the tokenized data transfer request. The one or more data transfer parameters may refer to any attribute, characteristic, data entry, etc. that define the data transfer. By way of example, the one or more data transfer parameters may include one or more data entries defining the intended recipient of the data transfer, one or more resources that are associated with the data transfer, a resource type, a resource quantity or amount, a requested encryption protocol for the data transfer, and/or the like. In some instances, the one or more data transfer parameters may be included with the request received at operation 402 or otherwise provided by the first user. By way of example, the first user may, via the mobile resource application of the first user, input the one or more data transfer parameters for the requested tokenized data transfers, and the system 130 may determine the one or more data transfer parameters based upon these inputs. In some embodiments, the tokenized data transfer of FIG. 4 may be for a first resource that is associated with underlying monetary value. In such an embodiment, the one or more data transfer parameters may include data entries that define the first resource to be a particular portion of the funds or financial instruments accessible by the first user via the mobile resource application for a particular recipient (e.g., an example second user).

Additionally or alternatively, in some embodiments, the system 130 may determine the one or more data transfer parameters without explicit input by the first user. By way of continued example, the system 130 may access a plurality of data transfers associated with the first user to identify prior selected resources, selected recipients, and/or the like defined by these data transfers. In doing so, the system 130 may operate to predict the one or more data transfer parameters at operation 404 based upon the data transfer parameters of prior tokenized data transfers. By way of a nonlimiting example, the system 130 may determine that the one or more data transfer parameters for the requested tokenized data transfer to be a first resource (e.g., funds totaling a first amount) for subsequent transfer to a second user based upon one or more prior tokenized data transfers between the first user and the second user for the same or similar amounts. Although described herein with reference to determining one or more data transfer parameters for a resource-based transfer between the first user and the second user, the present disclosure contemplates that the system 130 may determine data transfer parameters for tokenized data transfers of any type based upon the intended application of the system 130.

Thereafter, as shown in operation 406, the system 130 may be configured to generate a data transfer token for the first user based on the data transfer parameters. As described herein, the data transfer token may include at least a first resource associated with the first user, such as funds or other financial instruments with underlying monetary value. As described above with reference to FIGS. 2A-3B, the system 130 may include circuitry components configured to generate or "mint" a data transfer token (e.g., an NFT). As above, NFTs (e.g., data transfer tokens) are minted from digital objects that may represent both tangible and intangible objects, such as one or more resources of the first user. These resources (e.g., resources 302 in FIG. 3A) may refer to any object of any presumed value. By way of a non-limiting example, the system 130 an example data transfer token (e.g., an NFT) may comprise a first resource (e.g., funds or other financial instruments associated with monetary value). The first resource may be digitized into a proper format to produce the data transfer token (e.g. an NFT 304) that comprises the first resource. The data transfer token (e.g., the NFT 304) may be a multi-layered documentation that identifies the first resource but also evidences various transaction conditions associated therewith, as described in more detail above respect to FIG. 3A. The mechanism or technique by which the system 130 generates or mints the data transfer token (e.g., an NFT) may be at least partially determined based upon the one or more data transfer parameters determined at operation 404.

The first data transfer token may further be associated with one or more data records stored via a distributed ledger (e.g., DLT architecture 200 or the like). As described above, an example DLT may use a peer-to-peer protocol for a cryptographically secured distributed ledger of transactions represented as transaction objects (which may also be referred to herein as "data records") that are linked. In some embodiments, the transaction objects or data records may contain state information about a resource that is tracked by the system. As transaction objects each contain information about the transaction object previous to it, they are linked with each additional transaction object, reinforcing the ones before it. Therefore, distributed ledgers, and by association the generated data transfer token, are resistant to modification of their data because once recorded, the data in any given transaction object cannot be altered retroactively without altering all subsequent transaction objects.

In some embodiments, as shown in operation 408, the system 130 may be further configured to encrypt one or more data entries associated with the data transfer token. The tokenized data transfer request of operation 402 may, for example, include a request by the first user to encrypt at least a portion of the data associated with the transfer. By way of example, the first user may request (e.g., as defined by the one or more data transfer parameters or the like) that the intended recipient, the selected resource, the quantity or amount of the selected resource, etc. remain secured from view by third parties (i.e., for confidentiality purposes or the like). As such, the first user may request that the system 130 encrypt, via any data encryption/cryptographic mechanism or technique, at least a portion of the data that comprises the data transfer token generated at operation 406.

Thereafter, as shown in operation 410, the system 130 may be configured to provide the data transfer token within a mobile resource application of the first user. As described above, the system 130 may be associated with or otherwise provide an application by which the first user may interact with resources associated with the first user. The system 130 may, for example, provide a mobile resource application through which the first user may access funds or other financial instruments associated with underlying monetary value that are owned by the first user. As described further hereinafter with reference to operation 412, the mobile resource application of the first user may include a user interface that presents the data transfer token that comprises the first resource to the first user for review. In some embodiments, as described hereafter with reference to FIG. 6, the system 130 may operate to transfer the data transfer token of the first user to a mobile resource application of a second user (e.g., the intended recipient).

In some embodiments, as shown in operation 412, the system 130, in providing the data transfer token within the mobile resource application of the first user, may be further configured to generate a hybrid user interface. The hybrid user interface may refer to a user interface that displays various resources of the first user in the respective forms or formats associated with the resources. By way of example, the hybrid user interface may display a first portion of resources of the first user that includes the data transfer token comprising the first resource and a second portion of resources comprising untokenized resources of the first user. The first portion of resources may include all generated data transfer tokens associated with the first user, including the data transfer token that comprises the first resource. In some instances, the first portion of resources (e.g., the tokenized resources) may be illustrated in a separate tab, pane, window, and/or the like from the second portion of resources (e.g., the untokenized resources). The present disclosure contemplates that the hybrid user interface may use any mechanism or technique (e.g., relative size, color, aspect ratio, polarization, etc.) to display the collective resources of the first user.

Figure 5:
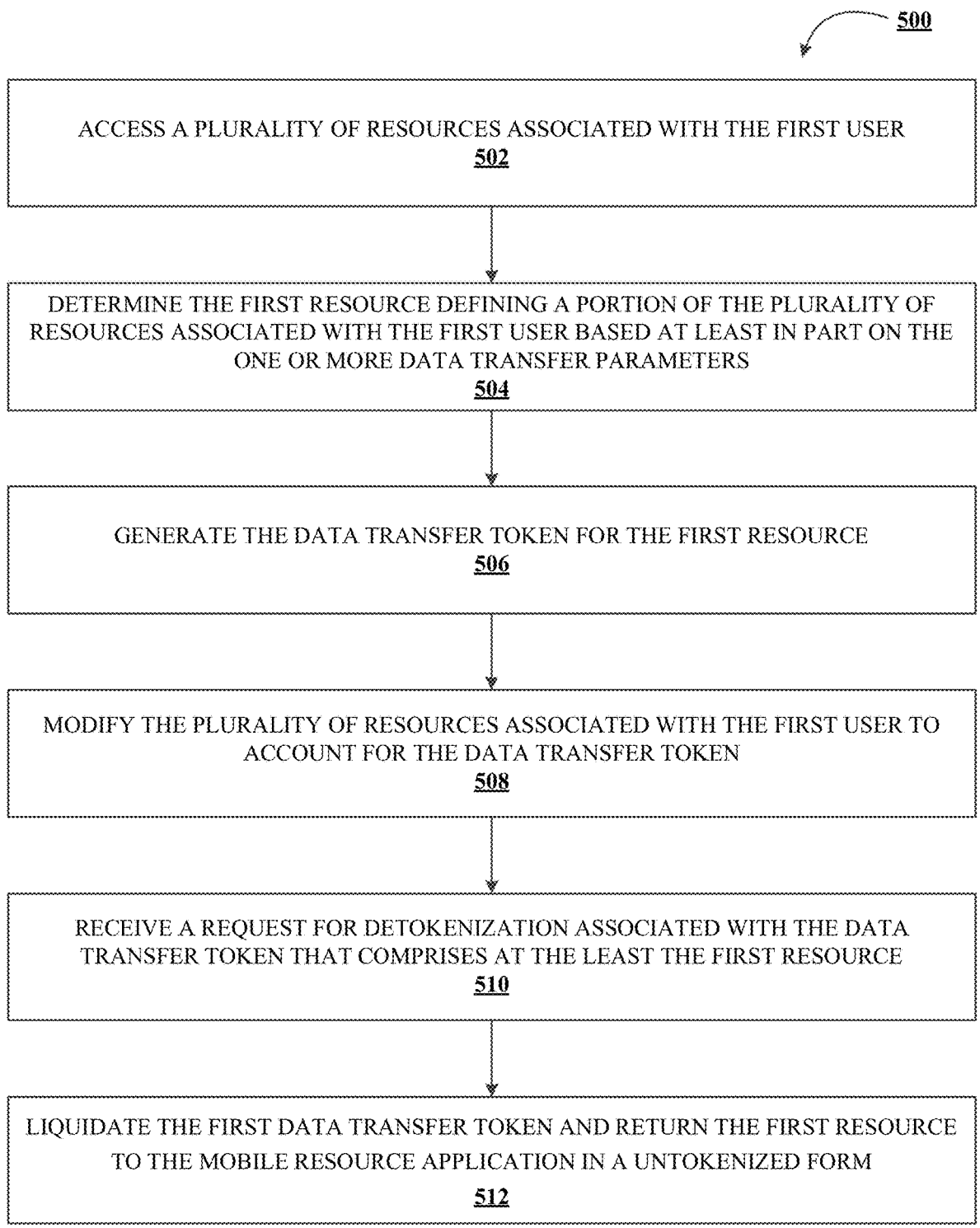
FIG. 5 illustrates a method for user data transfer token generation and detokenization in accordance with one or more embodiments of the present disclosure.

FIG. 5 illustrates a flowchart containing a series of operations for user data transfer token generation and detokenization (e.g., method 500). The operations illustrated in FIG. 5 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-3B (e.g., processor 102, processor 152, etc.).

As shown in operation 502, in some embodiments, the system 130 may be configured to access a plurality of resources associated with the first user to generate the requested data transfer token described with reference to FIG. 4. By way of continued example, the first user may be associated with (e.g., own or the like) a plurality of resources that are, at least in part, managed by an entity associated with the system 130 that may provide these resources to the first user via a mobile resource application. In order to generate the data transfer token, the system 130 may access the plurality of resources that are associated with the first user to generate a data transfer token that comprises the first resource. As would be evident to one of ordinary skill in the art in light of the present disclosure, the plurality of resources may refer to any portion (or the entirety) of the resources associated with the first user that are available to the system 130.

Thereafter, as shown in operations 504 and 506, the system 130 may be configured to determine the first resource defining a portion of the plurality of resources associated with the first user based at least in part on the one or more data transfer parameters and generate the data transfer token for the first resource. By way of continued example, the request for tokenized data transfer may be associated with the transfer of a first resource that is associated with funds or another financial instrument. As such, the plurality of resources for the first user may refer to a plurality of funds or financial instruments of the first user. In such an embodiment, the one or more data transfer parameters may define an amount or quantity of the resources of the first user, such that the first resource refers to a portion of the plurality of resource (e.g., an amount of funds defined by the one or more data transfer parameters). After determining the first resource, the system 130 may generate the data transfer token (e.g., an NFT) as described above with reference to operation 406.

Thereafter, as shown in operation 508, the system 130 may be configured to modify the plurality of resources associated with the first user to account for the data transfer token. As described above, the system 130 may be associated with a plurality of resources of the first user that includes at least the first resource that represents a portion of the plurality. At operation 508, the system 130 may modify the plurality of resources (e.g., untokenized resources or the like) to indicate that the data transfer token comprises the first resource. As described above with reference to operation 412, the system 130 may employ a hybrid user interface that delineates tokenized and untokenized resources for ease of review by the associated first user.

In some embodiments, as shown in operation 510, the system 130 may be configured to receive a request for detokenization associated with the data transfer token that comprises at the least the first resource. As would be evident to one of ordinary skill in the art in light of the present disclosure, in some embodiments, the first user may determine that the generated data transfer token is no longer necessary or desired, such as in instances in which the first user no longer intends to transfer the first resource, via the first data transfer token, to the second user. In such an embodiment, the system 130 may receive a request for detokenization from the first user, such as via a user input within the mobile resource application of the first user. In other embodiments, the system 130 may receive the detokenization request without explicit action by the first user. By way of example, the system 130 may be configured to monitor interactions by the first user, such as with the second user, and determine that the data transfer token that comprises the first resource is unnecessary (e.g., the second user is no longer associated with the first user, the reason for the tokenized data transfer no longer exists, etc.).

Thereafter, in some embodiments, as shown in operation 512, the system 130 may be configured to liquidate the first data transfer token and return the first resource to the mobile resource application of the first user in a untokenized form. By way of example, the system 130 may revert the operations described above with reference to FIG. 4 regarding minting the data transfer token (e.g., an NFT) in order to redeem the data transfer token for the first resource. Although described herein with reference to liquidation of the first data transfer token, the present disclosure contemplates that the data transfer token may be destroyed, reverted, redeemed, and/or the like by any mechanism or technique that results in return of the first resource in untokenized form. As described above, the hybrid user interface generated by the system 130 may operate to display the tokenized and untokenized resources of the first user, such that operation 512 results in reversion of the first resource from the first portion of resources (e.g., tokenized resources) to the second portion of resources (e.g., untokenized resources).

Figure 6:
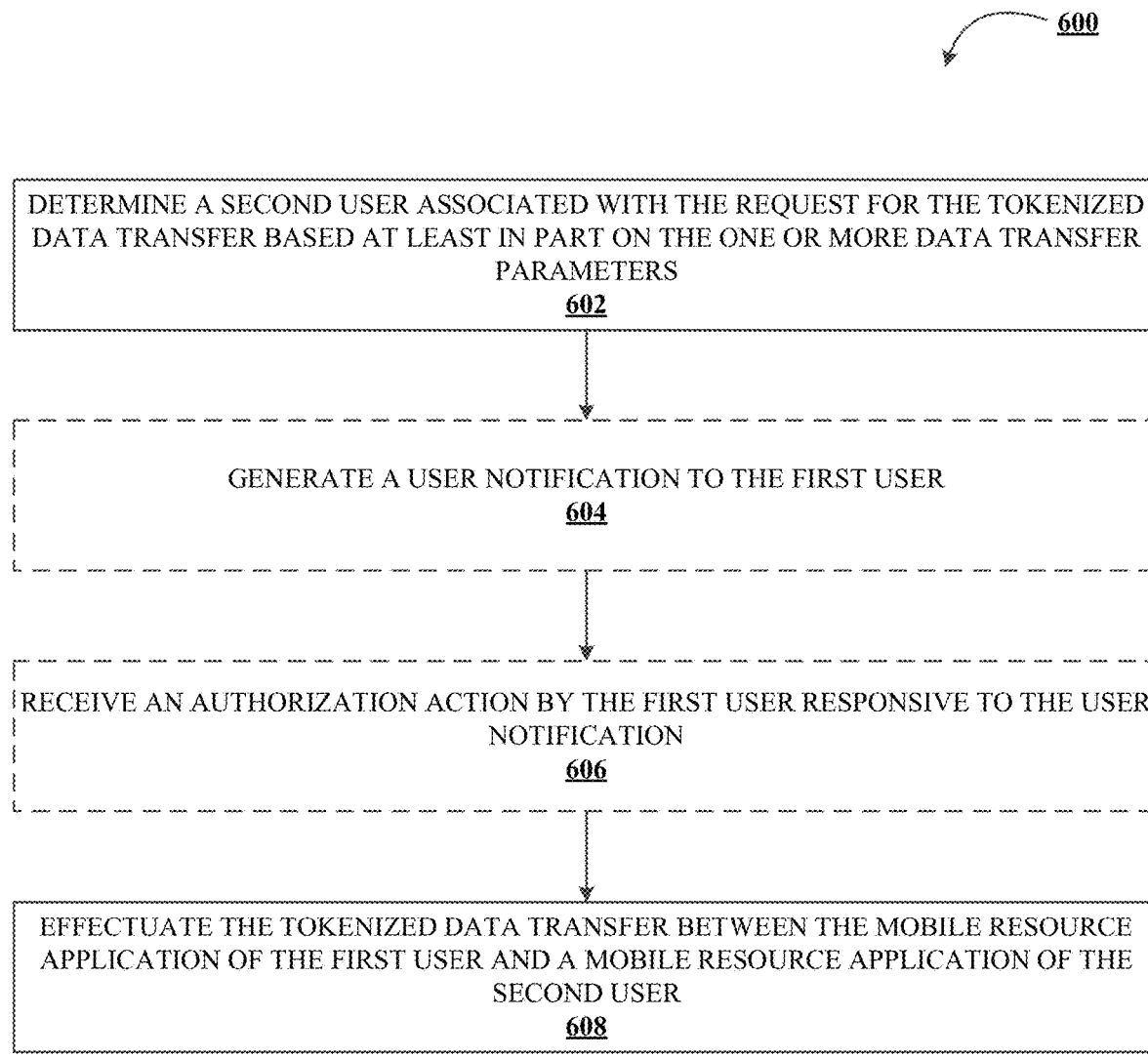
FIG. 6 illustrates a method for effectuating token transfers in accordance with one or more embodiments of the present disclosure.

FIG. 6 illustrates a flowchart containing a series of operations for effectuating token transfers (e.g., method 600). The operations illustrated in FIG. 6 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-3B (e.g., processor 102, processor 152, etc.).

As shown in operation 602, in some embodiments, the system 130 may be configured to determine a second user associated with the request for the tokenized data transfer based at least in part on the one or more data transfer parameters. As described above, the tokenized data transfers of the present disclosure may operate to securely transfer data, and underlying resources, between users. As such, the data transfer token that comprises the first resource of the first user may have an intended recipient (e.g., a second user). In some instances, the one or more data transfer parameters that are received by the system 130, such as via input by the first user, may explicitly identify the second user as the intended recipient. In other embodiments, as described above, the system 130 may operate to predict the intended recipient (e.g., the second user) based upon one or more prior data transfers (e.g., providing associated resources) by the first user.

In some embodiments, as shown in operations 604 and 606, the system 130 may be configured to generate a user notification to the first user and receive an authorization action by the first user responsive to the user notification. By way of example, the system 130 may, within the mobile resource application of the first user or otherwise, present to the first user a notification that indicates that the data transfer token comprising the first resource will be provided to the second user. The first user may, via one or more input objects or the like provided by the user notification, input an authorization action (e.g., an approval of the data transfer). The present disclosure contemplates that the system 130 may employ any mechanism or technique for receiving authorization from the first user. Similarly, the present disclosure contemplates that the user notification may be provided one or more input objects that, when selected, reject or otherwise prevent the data transfer to the second user.

Thereafter, as shown in operation 608, the system 130 may be configured to effectuate the tokenized data transfer from the mobile resource application of the first user to a mobile resource application of the second user. Similar to the mobile resource application of the first user described above, the system 130 may be associated with an entity that also manages one or more resources of the second user. As such, responsive to an authorization action by the first user or otherwise, the system 130 may be configured to effectuate the tokenized data transfer by transferring the data transfer token that comprises the first resource of the first user to the mobile banking application of the second user. The data transfer token comprising the first resource of the first user may be similarly presented to the second user via a hybrid user interface within the mobile resource application of the second user. The system 130 may, in some instances, operate to redeem the data transfer token for the second user so as to provide the first resource to the second user. In doing so, the embodiments of the present disclosure operate to secure data resources, via data transfer tokens within the mobile resource applications of the user, to provide immutable and durable mechanisms for tracking data transfers which were historically unavailable.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for tokenized data transfers between electronic devices in a distributed network, the system comprising:
    at least one non-transitory storage device; and
    at least one processor coupled to the at least one non-transitory storage device, wherein the at least one processor is configured to:
        receive a request for a tokenized data transfer associated with at least a first user;
        determine one or more data transfer parameters defining the tokenized data transfer request;
        generate a data transfer token for the first user based on the data transfer parameters, wherein the data transfer token comprises at least a first resource associated with the first user; and
        provide the data transfer token within a mobile resource application of the first user.

2. The system of claim 1, wherein, in providing the data transfer token within the mobile resource application of the first user, the processor is further configured to generate a hybrid user interface displaying:
    a first portion of resources of the first user that includes the data transfer token comprising the first resource; and
    a second portion of resources comprising untokenized resources of the first user.

3. The system of claim 1, wherein the processor is further configured to:
    access a plurality of resources associated with the first user;
    determine the first resource defining a portion of the plurality of resources associated with the first user based at least in part on the one or more data transfer parameters;
    generate the data transfer token for the first resource; and
    modify the plurality of resources associated with the first user to account for the data transfer token.

4. The system of claim 1, wherein the processor is further configured to:
    determine a second user associated with the request for the tokenized data transfer based at least in part on the one or more data transfer parameters; and
    effectuate the tokenized data transfer between the mobile resource application of the first user and the second user.

5. The system of claim 4, wherein the processor is further configured to:
    generate a user notification to the first user; and
    effectuate the tokenized data transfer in response to an authorization action by the first user responsive to the user notification.

6. The system of claim 4, wherein the processor is further configured to effectuate the tokenized data transfer from the mobile resource application of the first user to a mobile resource application of the second user.

7. The system of claim 1, wherein the processor is further configured to encrypt one or more data entries associated with the data transfer token.

8. The system of claim 1, wherein the first data transfer token is associated with one or more data records stored via a distributed ledger.

9. The system of claim 1, wherein the processor is further configured to:
    receive a request for detokenization associated with the data transfer token that comprises at the least the first resource;
    liquidate the first data transfer token; and
    return the first resource to the mobile resource application of the first user in a untokenized form.

10. A computer program product for tokenized data transfers between electronic devices in a distributed network, the computer program product comprising a non-transitory computer-readable medium comprising code that, when executed, causes an apparatus to:
    receive a request for a tokenized data transfer associated with at least a first user;
    determine one or more data transfer parameters defining the tokenized data transfer request;
    generate a data transfer token for the first user based on the data transfer parameters, wherein the data transfer token comprises at least a first resource associated with the first user; and
    provide the data transfer token within a mobile resource application of the first user.

11. The computer program product of claim 10, further comprising code that, when executed, causes the apparatus to generate a hybrid user interface displaying:
    a first portion of resources of the first user that includes the data transfer token comprising the first resource; and
    a second portion of resources comprising untokenized resources of the first user.

12. The computer program product of claim 10, further comprising code that, when executed, causes the apparatus to:
    access a plurality of resources associated with the first user;

determine the first resource defining a portion of the plurality of resources associated with the first user based at least in part on the one or more data transfer parameters;

generate the data transfer token for the first resource; and modify the plurality of resources associated with the first user to account for the data transfer token.

13. The computer program product of claim 10, further comprising code that, when executed, causes the apparatus to:

determine a second user associated with the request for the tokenized data transfer based at least in part on the one or more data transfer parameters; and effectuate the tokenized data transfer between the mobile resource application of the first user and a mobile resource application of the second user.

14. The computer program product of claim 13, further comprising code that, when executed, causes the apparatus to:

generate a user notification to the first user; and effectuate the tokenized data transfer in response to an authorization action by the first user responsive to the user notification.

15. The computer program product of claim 13, further comprising code that, when executed, causes the apparatus to:

receive a request for detokenization associated with the data transfer token that comprises at the least the first resource;

liquidate the first data transfer token; and return the first resource to the mobile resource application of the first user in a untokenized form.

16. A method for tokenized data transfers between electronic devices in a distributed network, the method comprising:

receiving a request for a tokenized data transfer associated with at least a first user;

determining one or more data transfer parameters defining the tokenized data transfer request;

generating a data transfer token for the first user based on the data transfer parameters, wherein the data transfer token comprises at least a first resource associated with the first user; and providing the data transfer token within a mobile resource application of the first user.

17. The method of claim 16, further comprising generating a hybrid user interface displaying:

a first portion of resources of the first user that includes the data transfer token comprising the first resource; and a second portion of resources comprising untokenized resources of the first user.

18. The method of claim 16, further comprising:

accessing a plurality of resources associated with the first user;

determining the first resource defining a portion of the plurality of resources associated with the first user based at least in part on the one or more data transfer parameters;

generating the data transfer token for the first resource; and modifying the plurality of resources associated with the first user to account for the data transfer token.

19. The method of claim 16, further comprising:

determining a second user associated with the request for the tokenized data transfer based at least in part on the one or more data transfer parameters; and effectuating the tokenized data transfer between the mobile resource application of the first user and a mobile resource application of the second user.

20. The method of claim 16, further comprising:

receiving a request for detokenization associated with the data transfer token that comprises at the least the first resource;

liquidating the first data transfer token; and returning the first resource to the mobile resource application of the first user in a untokenized form.

\* \* \* \* \*